Figures 1, 2, 3:
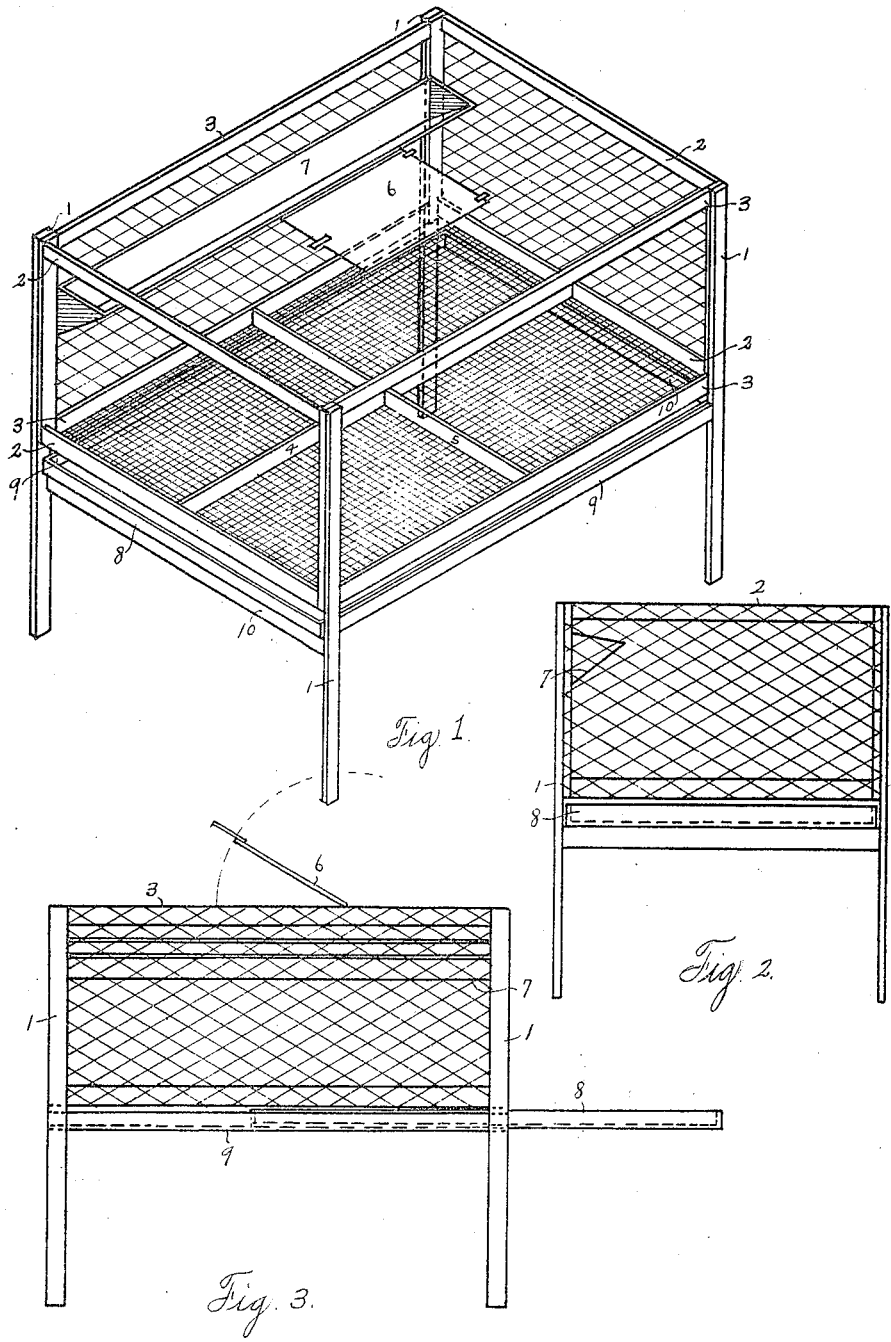

L. CLIPPINGER.
POULTRY COOP.
APPLICATION FILED JULY 6, 1914.

1,151,865.

Patented Aug. 31, 1915.

WITNESSES:
C Baylor Hill
May Montgomery

INVENTOR
Levi Clippinger,
BY
Hardway Cathey
ATTORNEYS.

UNITED STATES PATENT OFFICE.

LEVI CLIPPINGER, OF HOUSTON HEIGHTS, TEXAS.

POULTRY-COOP.

1,151,865.  Specification of Letters Patent.  Patented Aug. 31, 1915.

Application filed July 6, 1914. Serial No. 849,025.

*To all whom it may concern:*

Be it known that I, LEVI CLIPPINGER, a citizen of the United States, residing at Houston Heights, in the county of Harris and State of Texas, have invented certain new and useful Improvements in Poultry-Coops, of which the following is a specification.

This invention relates to new and useful improvements in poultry coops.

The object of the invention is to provide a coop of the character described for poultry and the like, which may easily be kept in a sanitary condition.

A further feature of the invention resides in the provision of a removable container, which is provided to contain a disinfectant in case it becomes necessary to use the same and this container is further provided to receive the refuse from the coop.

With the above and other objects in view, the invention has particular relation to certain novel features of construction, and arrangement of parts, an example of which is given in this specification and illustrated in the accompanying drawing, wherein—

Figure 1 is a perspective view of the device, showing the wire netting of the top and near walls removed. Fig. 2 is an end view of the coop, and Fig. 3 is a side elevation thereof.

Referring now more particularly to the drawing, wherein like numerals of reference designate similar parts in each of the figures, the numerals 1, 1, 1, 1 refer to the corner posts of the framework, to which are secured the upper and lower end members 2, 2 and the upper and lower side members 3, 3, these corner posts, end and side members forming a framework to which are secured suitable wire netting, forming the top, bottom, sides and ends of the coop and providing an inclosure for the poultry. The sides, ends and top of the coop are preferably formed of coarse mesh wire, but the bottom, forming the floor of the coop is formed of fine mesh wire and said bottom is reinforced by the lengthwise and transverse braces 4 and 5.

The top of the coop has a door 6 hinged thereto and provided to open and close a corresponding opening in the top, said opening being provided for the purpose of permitting the poultry to be placed in or taken from the coop and one side of the coop has a trough 7 secured thereto for the purpose of containing food and water for the poultry.

A shallow metallic pan 8 is provided whose length and width correspond to the said dimensions of the coop. This pan normally rests directly underneath the bottom or floor of the coop and usually contains water or a disinfectant and is particularly provided for the purpose of receiving the refuse falling through the mesh floor of the coop. This pan is supported by suitable side members 9, 9 and end members 10, 10 and is slidable back and forth endwise thereon and may readily be removed and emptied when it is desired.

The corner posts 1, 1, 1, 1 are extended downwardly below the coop proper, thus forming legs, as is illustrated in the figures.

I have shown only one form of this device, but it is obvious that the structure thereof may be varied without departing from the principle of the invention and I hereby reserve the right to make such changes as will not depart from the scope of the appended claim.

What I claim is:—

A device of the character described consisting of a frame work, whose corner posts are extended and formed into supporting legs, a top, bottom, sides and ends formed of wire mesh and supported by said frame work and forming an inclosed compartment, a lengthwise and a transverse centrally located bar, bracing said bottom and forming the roost poles for the fowls, a door for said compartment, a supporting bar secured to the legs at each end and a shallow pan underneath said bottom and slidably mounted on said bars.

In testimony whereof I have signed my name to this specification in the presence of two subscribing witnesses.

LEVI CLIPPINGER.

Witnesses:
  MAY MONTGOMERY,
  H. A. DECKER.